UNITED STATES PATENT OFFICE.

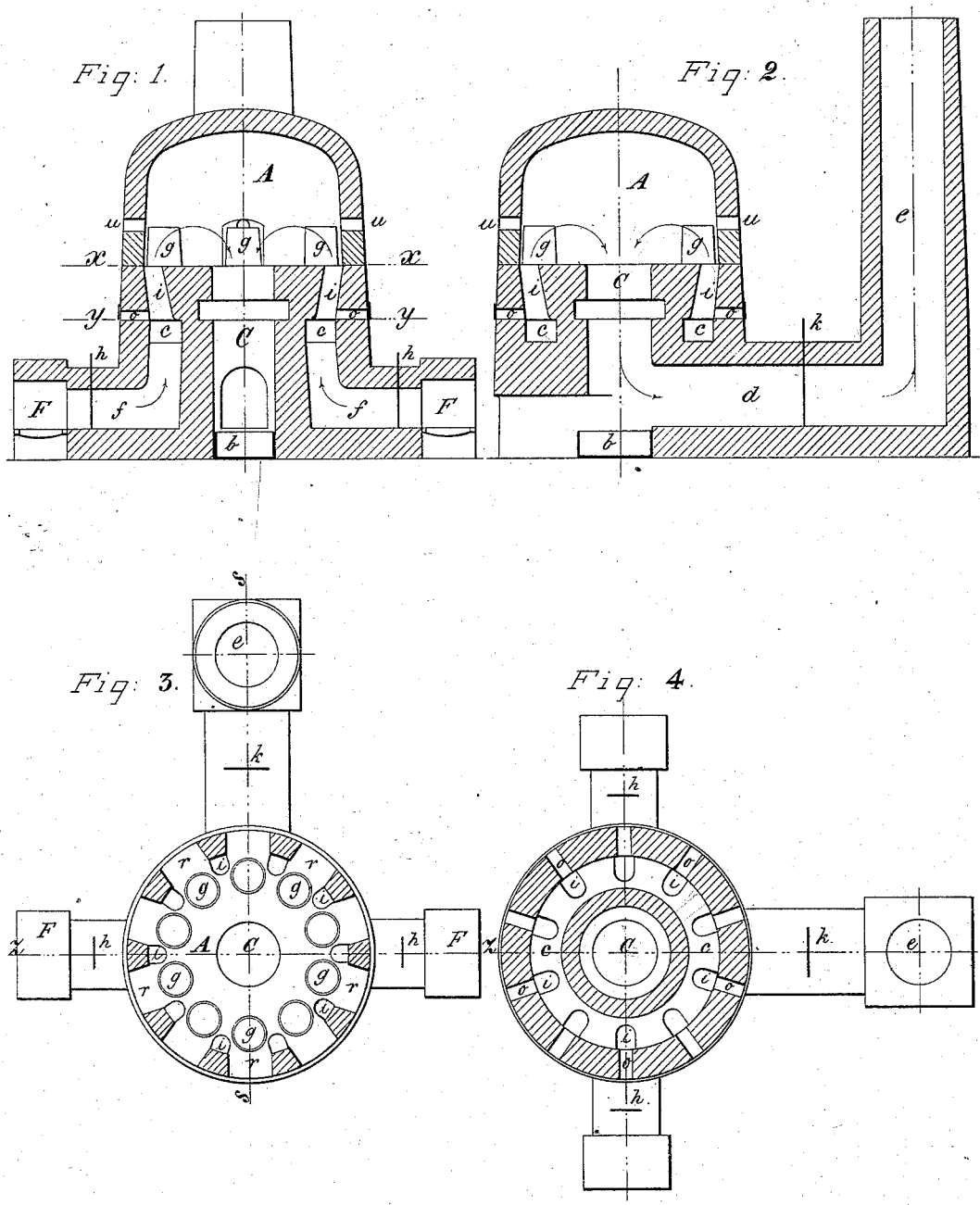

JAMES JOHNSON, OF PITTSBURG, PENNSYLVANIA.

IMPROVEMENT IN GLASS-FURNACES.

Specification forming part of Letters Patent No. 194,043, dated August 14, 1877; application filed July 7, 1877.

*To all whom it may concern:*

Be it known that I, JAMES JOHNSON, of Pittsburg, in the county of Allegheny and State of Pennsylvania, have invented a new and useful Improvement in Glass-Furnaces; and I do hereby declare the following to be a full, clear, and exact description of the same, reference being had to the accompanying drawing, forming part of this specification, and of which—

Figure 1 represents a vertical section taken at line $zz$ of Fig. 3. Fig. 2 is also a vertical section taken at line $ss$ of Fig. 3. Fig. 3 is a horizontal section taken at line $xx$ of Fig. 1, and Fig. 4 is a horizontal section taken at line $yy$ of Fig. 1.

The invention consists in the combination and arrangement of a furnace for melting or heating glass or other similar substances.

A is a circular heating-chamber receiving the pots $g\ g\ g\ g$. F F are fire-grates to produce the required heat.

The novelty of the invention lies in the construction and arrangement of the flues, by which a greater part of the heat is utilized. The burning gases coming from the grates F F pass, through the flues $ff$, first into the circular flue $c$ below the bottom of the heating-chamber A. Thus the glass-pots $g\ g\ g\ g$ are heated from below. Thence, by means of numerous small flues, $i\ i\ i\ i$, the mixture of gases and heated air passes into the chamber A, where it surrounds the pots and can freely burn; but before entering into the chamber A any amount of air can be mixed with it to produce full combustion of the gases. This is done by means of the air-inlets $o\ o\ o$, regulated by dampers.

From the heating-chamber A the unburned gases escape into the center flue C, the horizontal flue $d$, and chimney $e$, as shown by the arrows. The draft of the fire might also be regulated by opening or closing the dampers $h\ h$, or by the damper $k$, between the furnace and the chimney.

The operation of the furnace is the same as usual. After the pots $g\ g\ g\ g$ have been filled and entered into the chamber A, the openings $r\ r\ r\ r$ are closed, and only small holes $u\ u\ u$ are left to extract the liquid glass.

Another great improvement of my furnace is the saving of the melted glass in case of breaking of the pots.

By the kind of furnaces now in use the liquid glass runs into the flues, and is lost, while in my furnace provision is made to receive the glass into a special box, $b$, placed at the bottom of the center flue C, from which it might at any time be removed.

Having thus described my invention, what I claim as new is—

1. In a furnace for melting glass or other similar substances, the circular flue C, below the bottom of the furnace, in combination with the flues $i\ i\ i$ and the heating-chamber A, as described and set forth.

2. In a furnace for melting glass or other similar substances, the combination of the flues $i\ i\ i\ i$ with the heating-chamber A, the center flue C, and horizontal flue $d$, as described, and for the purpose set forth.

3. The box $b$, receiving the melted glass, which might run out of the chamber A, in combination with the center flue C, as described and set forth.

JAMES JOHNSON.

Witnesses:
J. J. McCORMICK,
M. F. CONNOLLY.